US006869583B2

(12) United States Patent
Harutyunyan et al.

(10) Patent No.: US 6,869,583 B2
(45) Date of Patent: Mar. 22, 2005

(54) PURIFICATION OF CARBON FILAMENTS AND THEIR USE IN STORING HYDROGEN

(75) Inventors: Avetik Harutyunyan, Columbus, OH (US); Bhabendra Pradhan, State College, PA (US); Peter C. Eklund, Boalsburg, PA (US); Yoshiya Fujiwara, Saitama (JP); Hajime Goto, Saitama (JP)

(73) Assignees: The Penn State Research Foundation, University Park, PA (US); Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/120,827

(22) Filed: Apr. 12, 2002

(65) Prior Publication Data

US 2003/0031620 A1 Feb. 13, 2003

Related U.S. Application Data

(60) Provisional application No. 60/283,470, filed on Apr. 12, 2001, and provisional application No. 60/324,066, filed on Sep. 24, 2001.

(51) Int. Cl.$^7$ .................................................. D01F 9/12

(52) U.S. Cl. .................................... 423/461; 423/447.1

(58) Field of Search .......................... 423/447.1, 447.2, 423/445 R, 445 B, 461

(56) References Cited

U.S. PATENT DOCUMENTS

| 5,641,466 A | | 6/1997 | Ebbesen et al. | |
|---|---|---|---|---|
| 5,695,734 A | * | 12/1997 | Ikazaki et al. | 423/461 |
| 5,698,175 A | * | 12/1997 | Hiura et al. | 423/447.1 |
| 2002/0127171 A1 | * | 9/2002 | Smalley et a | 423/447.6 |

FOREIGN PATENT DOCUMENTS

WO  WO 96/09246  3/1996

OTHER PUBLICATIONS

Chiang et al. "Purification and Characterization of Single–Wall Carbon Nanotubes", Jan. 12, 2001, Journal of Physical Chemistry B, vol. 105, pp. 1157–1161.*
A.G. Rinzler et al., Large–scale purification of single–wall carbon nanotubes: process, product, and characterization, Applied Physics A, 1998, 67, pp. 29–37.
E. Dujardin et al., "Communication: Purification of single–shell nantubes", Adv. Mater, 1998, 10, pp. 611–613.
Konstantin B. Shelimov et al., "Purification of single–wall carbon nanotubes by ultrasonically assisted filtration", Chemical Physics Letters, 282, 1998, pp. 429–434.
S. Bandow et al., "Purification and magnetic properties of carbon nanotubes", Appl. Phys. A, 67, 1998, pp. 23–27.
Zujin Shi et al., "Purification of single–wall carbon nanotubes", Solid State Communications 112, 1999, pp. 35–37.

Anne Dillon et al., "A Simple and Complete Purification of Single–Walled Carbon Nanotube Materials", Adv. Matter, 1999, 11, No. 16, pp. 1354–1358.
M. Holzinger et al., A new purification method for single–wall carbon nanotubes (SWNTs), Appl. Phys. A 70, 2000, pp. 599–602.
E. Mizoguti et al., "Purification of single–wall carbon nanotubes by using ultrafine gold particles", Chemical Physics Letters 321, 2000, pp. 297–301.
John L. Zimmerman et al., "Gas–Phase Purification of Single–Wall Carbon Nanotubes", Chem. Mater. 2000, 12, pp. 1361–1366.
J.F. Colomer et al., "Different purification methods of carbon nanotubes produced by catalytic synthesis", International Conference on Science and Technology of Synthetic Metals, Montpellier, France, Jul. 12–16, 1998, vol. 103, No. 1–3, pp. 2482–2483, XP 002207149, Synthetic Metals, Jun. 1999, Elsevier, Switzerland.
Y. Zhang et al., "Structure modification of single–wall carbon nanotubes", Carbon Elsevier Science Publishing, New York, NY, US, vol. 38, No. 15, 2000, pp. 2055–2059, XP004217750.
Anne C. Dillon, et al., "A Simple and Complete Purification of Single–Walled Carbon Nanotube Materials", Advanced Materials, VCH Verlagsgesellschaft, Weinheim, DE, vol. 1, No. 16, Nov. 10, 1999, pp. 1354–1358, XP000875153.
T.W. Ebbesen et al., "Purification of Nanotubes", NATURE, vol. 367, No. 6463, Feb. 10, 1994, p. 519, XP002207406.
Derwent Publications Ltd., London, GB;, AN 2001–528221, XP002207408 & KR 2001 027 422 A, Apr. 4, 2001 abstract.
H. Zhang et al., Electron spin resonance of carbon nanotubes prepared under two kinds of inert gas ambient, Fullerenes and Related Materials, Selected Papers Presented at Symposium C of the IUMRS–ICAM '99, Beijing, China, Jun. 13–18, 1999, vol. 61, No. 7, pp. 1123–1125, XP 002207407, Journal of Physics and Chemistry of Solids, Jul. 2000, Elsevier, UK.

(List continued on next page.)

Primary Examiner—Stuart L. Hendrickson
Assistant Examiner—Peter J Lish
(74) Attorney, Agent, or Firm—McDermott Will & Emery LLP

(57) ABSTRACT

Carbon structures, e.g. carbon nano-fibers, suitable for absorbing hydrogen at low pressures and low temperatures are produced by a selective oxidation and/or acid reflux process. The process includes heating an impure mixture containing a crystalline form of carbon in the presence of an oxidizing gas at a temperature and time sufficient to selectively oxidize and remove a substantial amount of any amorphous carbon impurities from the mixture. Metal containing impurities can be removed from the mixture by exposing the desired carbon and accompanying impurities to an acid to produce a carbon fiber that is substantially free of both non-fiber carbon impurities and metal impurities. Another aspect of the present invention includes purified carbon structures that can store hydrogen at low pressures and temperatures.

9 Claims, 5 Drawing Sheets

OTHER PUBLICATIONS

Y. Ye et al., "Hydrogen Adsorption and Cohesive Energy of Single–Walled Carbon Nanotubes", Applied Physics Letters. American Institute of Physics. New York, US, vol. 74, No. 16, Apr. 19, 1999, pp. 2307–2309, XP000829881.

A C. Dillon et al., "Storage of Hydrogen in Single–Walled Carbon Nanotubes", NATURE, Macmillan Journals Ltd., London, GB, vol. 386, Mar. 27, 1997, pp. 377–379, XP000783873.

Anya Kuznetsova et al., "Enhancement of adsorption inside of single–walled nanotubes: opening the entry ports", Chemical Physics Letter, Apr. 28, 2000, Elsevier, Netherlands, vol. 321, No. 3–4, pp. 292–296; XP002256163.

K. Hernadi et al., "Reactivity of different kinds of carbon during oxidative purification of catalytically prepared carbon nanotubes", 14th International Symposium on the Reactivity of Solids, Budapest, Hungary, Aug. 27–31, 2000, vol. 141–142, pp. 203–209, XP004248328, Solid State Ionics. Diffusion & Reactions.

* cited by examiner

PURIFICATION OF CARBON FILAMENTS AND THEIR USE IN STORING HYDROGEN

CROSS-REFERENCE TO RELATED APPLICATIONS

This application claims priority from U.S. Provisional Patent Application Serial No. 60/324,066 filed Sep. 24, 2001, entitled, "PURIFICATION OF CARBON FILAMENTS AND THEIR USE IN STORING HYRDOGEN" and U.S. Provisional Patent Application Serial No. 60/283,470 filed Apr. 12, 2001, entitled, "PURIFICATION OF CARBON FILAMENTS USSED FOR HYDROGEN STORAGE AT LOW PRESSURE AND CRYOGENIC TEMPERATURE" the entire discloses of which are incorporated herein by reference.

FIELD OF THE INVENTION

The present invention relates to carbon filaments and processes for their production and more particularly to a process for obtaining purified single-walled nanotubes these materials have utility in the fields of chemistry, drugs, electronics, transportation, among others.

BACKGROUND

Single-wall carbon nanotubes (SWNTs) were reported simultaneously by Iijima and co-workers at NEC and by Bethune and co-workers at IBM as early as 1993. The structure of a SWNT has been described as a single graphene sheet rolled into a seamless cylinder (Science of Fullerenes and Carbon Nanotubes, M. S. Dresselhaus et al. Ed., Academic Press. 1996). These materials are considered commercially important for a number of new technologies and as replacement materials for current technologies.

Fuel-cell-powered ground transportation, for example, has been recognized by the U.S. Department of Transportation (USDOE) and automobile manufacturers worldwide as a desired technology and a growing interest has developed for employing carbon nanotubes for these applications. For example, hydrogen storage in a carbon-based material has the recognized advantage of overall low weight. While fuel cell technology is relatively advanced, the technology for storing the fuel, such as hydrogen, lags in the development of a viable fuel-cell-powered vehicle. The USDOE has estimated that storing approximately 6 to 7 weight percent (wt %) of hydrogen should be the benchmark for a feasible hydrogen storage technology. Hydrogen storage is the wt % of hydrogen stored measured relative to the storage system.

The physical adsorption of gases within micropores (D<2 nm) in carbon materials has been actively studied for some time. Many such microporous carbon materials have been developed with very high specific surface area, e.g., $A_s$ of approximately 1000–3000 $m^2/g$. These materials, however, tend to be disordered and have convoluted surfaces exhibiting local $sp^2$ C—C bonding. These materials, they have been tested for hydrogen storage and are not been considered promising.

Significant $H_2$ storage has been reported in nanofilamentary carbon at room temperature, however. For example, it has been reported that 5–10 wt % of hydrogen can be stored in bundles of single-walled carbon nanotubes (SWNT), 10–20 wt % of hydrogen can be stored in alkali metal-doped SWNTs, and also about 50 wt % of hydrogen can be stored in carbon nanofibers. Cryogenic hydrogen storage of approximately 8 wt % has also been reported using high pressures, e.g., pressures of about 100 atm. None of these reports have been confirmed in other laboratories and, in some cases, the accuracy and validity of these reports have been questioned suggesting that the published values were the result of experimental error. Hence, it is difficult to build upon the efforts of others in this developing filed of hydrogen storage technology.

Moreover, many of the proposed applications of SWNT, including nano-electronic devices, field emitters, gas sensors, high-strength composites, and hydrogen storage require reasonably pure SWNT materials. Typical synthetic methods currently produce carbon tubes having a diameter in the range of 1–2 nm and arranged in the form of bundles. One particular problem associated with conventional synthetic techniques is that the intended SWNT is a minority constituent in the reaction product. Also present, for example, are amorphous $sp^2$ carbons which coat the fiber walls and multi-shell carbon species which cover metal catalyst impurities that result from the catalytic production of conventional carbon fibers and SWNTs. It is a challenging problem to separate the desired SWNT from its accompanying mixture of amorphous carbon impurities, multi-shell carbon species and metal impurities without adversely damaging the carbon fiber or the tube walls.

Many purification procedures have been developed to remove the inherent contaminates from carbonaceous soots produced in an effort to obtain the desired SWNT. These methods include hydrothermal treatment, gaseous or catalytic oxidation, nitric acid reflux, peroxide reflux, cross flow filtration, and chromatography.

These treatment, however, tend to chemically destroy a significant portion of the desired carbon nanotubes, require excessive production times and, in the case of arc produced carbon nanofibers, have a marginal effect in purifying the desired carbon nanofibres from its impurities, such as amorphous carbon phases and graphitic carbon phases covering metal impurities. It is also unfortunate that the results of many of these purification processes have not been even semi-quantitatively determined with respect to the purity of the final product. Thus, they have been of little aid to the skilled artisan in advancing the understanding of purification procedures thereby reducing the predictability of successfully achieving a process of purifying SWNT in high yield and throughput.

Furthermore, most of the purification processes reported previously were for carbon-nanofibers produced by a pulse laser vaporization (PLV) process which inherently produces smaller amounts of catalyst residue and smaller amounts of multi-shell carbon phases as well.

Accordingly, a need exists for the efficient purification of carbon fibers, particularly nanosized carbon fibers in high yield and throughput.

BRIEF SUMMARY

An advantage of the present invention is a facile method of obtaining carbon structures from an impure mixture in high yields.

Another advantage of the present invention is the synthesis of single-walled nano-tubes suitable for hydrogen storage.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

According to the present invention, the foregoing and other advantages are achieved in part by a process of reducing the amount of amorphous carbon from a carbon mixture. The process comprises heating an impure mixture containing amorphous carbon and at lest one crystalline form of carbon in the presence of an oxidizing gas at a temperature and time sufficient to selectively oxidize and reduce the amount of amorphous carbon impurities from the mixture. Advantageously, the present inventive process permits the purification of single-walled nano-tubes from relatively inexpensive, yet difficult to purify, arc-derived soot. These soots typically have a substantial amount of amorphous carbon as well as other undesirable carbon forms in addition to the desired carbon structures. These undesirable carbon forms can be reduced, i.e. lowered from their initial concentration of untreated material, by selective oxidation. Metal containing impurities can also be reduced or removed from the mixture by exposing the desired carbon structures and accompanying impurities to an acid to produce a carbon structure, e.g. carbon fiber, that is substantially free of the undesirable carbon, i.e. carbon impurities, and metal impurities. Additional processing steps can include heating the purified carbon structure under vacuum to anneal the carbon structure to ameliorate part or all of any defects that were formed in the carbon structure during the purification process or other wise.

Embodiments of the present invention include heating the impure carbon mixture in the presence of an oxidizing gas to a temperature from about 295° C. to about 500° C., e.g. from about 350° C. to about 410° C., to reduce carbon impurities, such as amorphous carbon and graphitic carbon covering metal containing impurities; removing metal containing impurities by exposing the impure mixture to an acid, e.g. nitric or hydrochloric acid, at a temperature from about 25° C. to about the boiling temperature of the acid.

Another aspect of the present invention is a process of purifying a carbon nano-fiber. The process comprises heating an impure mixture containing the carbon nano-fiber in the presence of an oxidizing gas, e.g. air, and at a temperature and time sufficient to selectively oxidize and reduce the amount of carbon impurities from the mixture. Metal containing impurities, e.g. metal catalyst and their salts, are reduced or substantially removed from the mixture by exposing the mixture to an acid, e.g. hydrochloric acid, to produce a carbon fiber reduced or substantially free of carbon impurities and metal containing impurities. The purified carbon-nano-fiber can then be subjected to heat, e.g. about 220° C. to about 1000° C., under a vacuum, e.g. between about $10^{-8}$ Torr to about $10^{-6}$ Torr, to ameliorate damage to the tubes caused by or in addition to the purification process.

Another aspect of the present invention includes a material for storing hydrogen at low pressures comprising a purified single-wall carbon nanotube having opposing open ends or open passages, i.e. open holes. Advantageously, the material can store more than about 6 weight percent (wt/%) of hydrogen, e.g., about 6.5 wt %, at a temperature of about 77 K and at a pressure of less than 2 atmospheres. Hydrogen can be stored in a single-wall carbon nanotube having openings therein simply by: a) subjecting a purified single-wall carbon nanotube to hydrogen gas at a pressure of no more than about 2 atmospheres and a temperature of about 77 K.

In an embodiment of the present invention, carbon-nanotubes having open ends can be synthesized by a process comprising the sequential steps of: a) heating a carbon based mixture comprising a single-wall carbon nanotube and accompanying impurities in the presence of an oxidizing gas at a temperature sufficient to selectively remove a substantial amount of carbon impurities; b) exposing the mixture to an acid sufficient to remove a substantial amount of metal impurities; and c) exposing the single-wall carbon nanotube to nitric acid at a temperature and time period sufficient to introduce openings in the single-wall carbon nanotube.

Another aspect of the present invention is a process for producing a nano-structured carbon suitable for absorbing hydrogen at low pressures and low temperatures. The process comprises the sequential steps of: a) refluxing a nano-structured carbon with an agent to partially oxidize the surface of the nano-structured carbon and form functional groups other than hydrogen thereon; b) washing the nano-structured carbon in water; c) drying the nano-structured carbon; and d) heating the nano-structured carbon, e.g heating over about 650 C; under vacuum, e.g. under a vacuum of about $10^{-6}$ Torr or higher, to substantially remove the functional groups on the surface of nano-structured carbon. The present invention contemplates that the surface of the carbon structure has at least one group or moiety selected from the group consisting of: a carboxyl group (—COOH), an aldehyde group (—CHO), a carbonyl group (>C=O); methylene coupling and ether coupling. It is believed that refluxing by acid to oxidize the surface as well as removing the formed functional groups by heating facilitates improvements in the final product for hydrogen storage suitability.

Additional advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DESCRIPTION OF THE INVENTION

Figure 1:
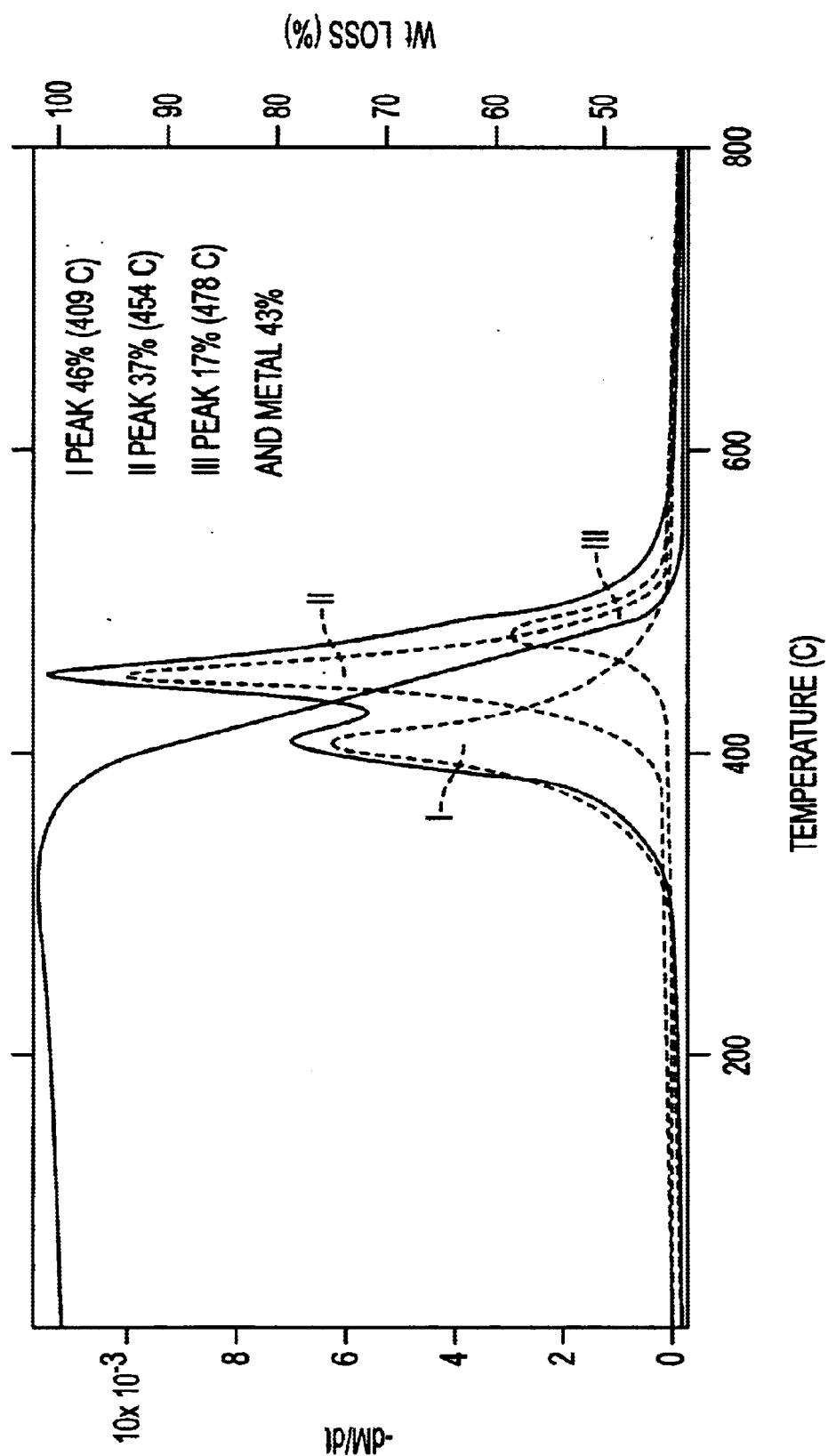
FIG. 1 illustrates Temperature Programmed Oxidation (TPO) and Derivative Temperature Programmed Oxidation (DTPO) profiles of a raw, arc-derived soot which contains SWNTs.

The present invention addresses the problems associated with the separation of desired crystalline carbon forms, e.g.

filamentary carbon, produced from a mixture containing undesirable carbon forms, e.g. amorphous carbon impurities, and metal containing impurities. After extensive experimentation and investigation, an effective, non-destructive purification process was developed to obtain filamentary carbon, e.g. single-walled nano-tubes, in high yields from such mixtures.

The present invention stems from the discovery that amorphous carbon impurities can be selectively oxidized and, thus, reduced or removed from carbon mixtures, such as arc-derived carbon soots to generate purified carbon fibers. Since the initial carbon mixture contains these undesirable carbon impurities, any amount of a reduction is beneficial.

It was also observed that the integrity or viability of semi-crystalline or multi-shell carbon covering metal catalyst impurities in these soots are reduced during the selective oxidation process thereby rendering the metal impurities more susceptible to removal. It was discovered that the use of these purified carbon fibers can store relatively high amounts of $H_2$. The results are significant, as the hydrogen storage in these purified carbon fibers and/or tubes can occur at relatively low pressures, e.g. at pressures of about 1–2 atmospheres.

In order to address the difficulties of achieving an effective purification process for separating the desired crystalline carbon structures from an impure mixture, it was necessary to gain an understanding of the causes underlying such problems. A quantitative study was undertaken to evaluate the effectiveness of a purification process involving the selective oxidation of the commercially available soots. Results are presented on soots produced by arc-discharge (AD), which are believed to be difficult to purify.

In accordance with one aspect of the present invention, a simple selective oxidation-acid reflux process can be employed to achieve purification of gram quantities of raw arc-derived SWNT materials (which is unsuitable for purification by the existing purification methods) in excess 85 wt %. In studying the underlying aspects of the purification process, quantitative evaluation of different phase (wt %) of carbons was determined as a function of purification treatments by using Temperature Programmed Oxidation (TPO). It was discovered that initial selective oxidation to remove amorphous carbon does not adversely effect the carbon tubes in the soots and that selective oxidation has the added benefit of removing or weakening multi-shell carbon. The exposed metal particles can then be successfully removed by acid, e.g. HCl, treatment under less sever conditions than conventionally employed. It is believed that the specific working examples provided in this disclosure is applicable to industrial, e.g. large scale, purification of SWNTs and also applicable to a variety of other nanofiber mixtures, i.e., graphitic nanofiber (GNF), vapor grown graphitic fiber (VGF), pulse laser vaporization (PLV), arc discharged (AD), etc.

EXAMPLES

The raw soots produced by AD were prepared as described earlier (C. Journet et al., Nature vol 388, pp 756) and received as dry powders from Carbolex, Inc. of Lexington, Ky. Chemical analysis of these soots were carried out by temperature programmed oxidation (TPO) using a TG-50 Mettler thermogravimetric analyzer (TGA). The TGA reaction conditions included a 5° C./min heating rate starting from about 25 C. and ending at about 1000° C. under a flow of dry air at about 100 sccm. From the first derivative of the TPO curve, or the DTPO curve, the preferential oxidation temperatures of the different phases of carbon in these soots were determined, as described below.

For purification, raw SWNT soot was selectively oxidized under conditions defined by the TPO results. The soot was then refluxed in hydrochloric acid (HCl) using standard Pyrex glassware for a few hours, and the suspension was then filtered through a polycarbonate membrane filter (pore size=1 μm, available from Corning, Inc.). The filtrate was carefully washed with deionized water, and then dried. Transmission electron micrographs of the SWNT soots were observed on a JEOL JEM 1200EX microscope with electron beam energy of 120 KV.

The term "temperature programmed oxidation" (TPO) was apparently coined by C. A. Querni et al. J. Catal. 141 (1993) 389. TPO in a TGA has been used, inter alia, invention to analyze carbonaceous soots produced by arc discharge. The soot is maintained in a flow of dry air and the temperature (T) is ramped from about 25–1000° C., linearly in time, and thus the T-dependance of the soot mass m(T) can be measured. With increasing T, carbon is converted to $CO_2$ and m(T) decreases. Characteristic combustion temperatures of various carbon phases in the soots, e.g., amorphous carbon, SWNT, and multi-shell or graphitic carbon, can be identified from the peak positions in the derivative data (DTPO), i.e., dm/dT vs T data. FIG. 1 shows the TPO and DTPO profiles of the raw AD soot. The DTPO data is fit by a sum of Lorentzian, as shown in FIG. 1 by the broken lines. From the fitted data, the effective oxidation temperatures $T_{ox}$ for amorphous carbon (409° C.), SWNT (454° C.), and multishell and graphitic carbon (478° C.) was determined. The identifications of the peaks with the respective carbon phases are consistent with the literature and are supported by TEM images, as discussed below. It should be noted that the $T_{ox}$ can be shifted downward by the presence of a catalyst in the soot.

The fraction of carbon in the soot in the form of amorphous carbon, SWNT and multishell carbon is identified with the area under the respective Lorentzian in the DPTO data. For example, from the DTPO peak areas in FIG. 1, it can be determine that the raw AD soot contains the following carbon fractions: 46% amorphous ($sp^2$) carbon, 37% SWNT and 17% multishell carbon (it should be noted that these are fractional percentages, not wt %; for the wt % see Table 1). The metal content (wt %) in the soot is obtained from the high temperature mass in the TPO curves, i.e., metal cannot be converted to $CO_2$, even at elevated temperatures. From the TPO profile in FIG. 1, it can be seen that 43 wt % of the raw AD soot should be identified with catalyst residue, or non volatile metals or metal compounds such as carbides. The results from TPO and DTPO data for the various raw and purified soots are summarized in Table 1.

From the DTPO data on raw AD soot in FIG. 1, it can be seen that the oxidation temperature range of amorphous carbon and multishell carbon overlaps the oxidation range for SWNTs. Hence, it is expected that for this example the amorphous and multishell carbon impurities cannot be completely removed without some attendant loss of SWNT by oxidation. To minimize the loss of SWNTs, the following conditions were selected to purify AD soot in flowing dry air: linear heating rate of 5 C./min from about 24 to about 405 C; followed by an about 405 C. soak for about 30 min, then the system is cooled down to room temperature in approximately 1 hr. This thermal oxidation weakens or completely removes the multishell carbon covering the metal catalyst particles (as shown by TEM). Mild acids such as 4 molar (M) hydrochloric (HCl) can then be used to remove the metal catalyst residue. Moreover, without prior selective oxidation, acid reflux for extended times (even using $HNO_3$) was found to be ineffective for the removal of metal from the soots.

Figure 2:
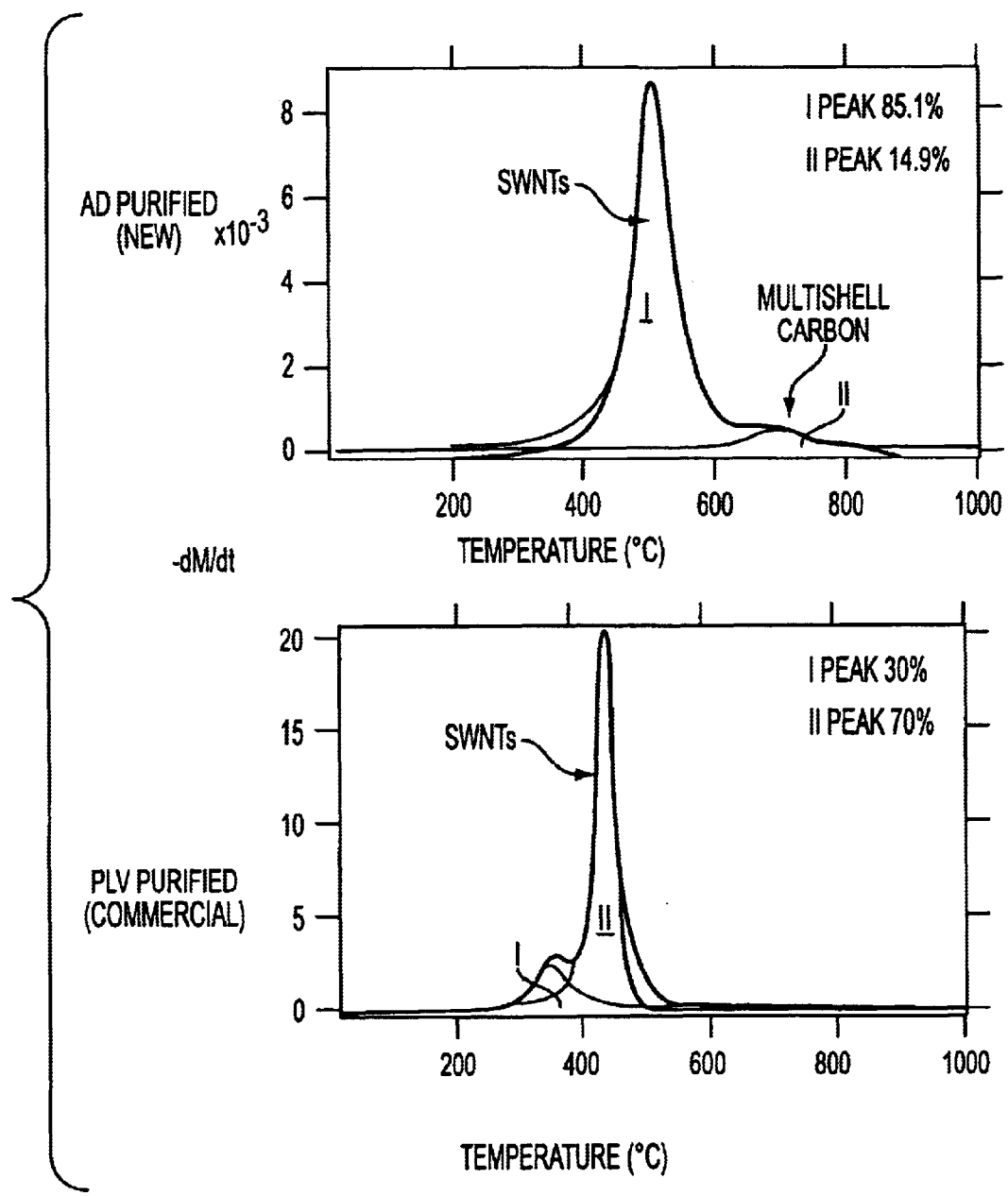
FIGS. 2a and 2b show TPO and DTPO profiles of a purified SWNTs by selective oxidation followed by mild acid refluxing in accordance with an embodiment of the present invention compared to commercially purified Pulse Laser Vapor (PLV) carbon nano-tubes, respectively.

FIG. 2 shows the TPO/DTPO profiles for the AD soot after selective oxidation and acid reflux processes. Refluxing was carried out in 4 M HCl for about 4 hr. The DTPO data for the purified sample shows one dominant carbon peak (representing SWNTs) and a weaker carbon peak representative of residual multishell carbons; a peak representative of amorphous carbon could not be found. Hence, in this example, all measurable amorphous carbon was removed. Lorentzian analysis of the DTPO peaks for the purified AD soot yielded the following carbon fractions: 85% SWNTs ($T_{ox}$ of about 507° C.) and with 15% of multi-shell carbon ($T_{ox}$ about 700° C.). Relative to $T_{ox}$ (SWNT) for the raw AD soot, it can also be seen that the oxidation temperature of the SWNT shifts upward by about 50° C. to approximately 507° C., which is still lower than the temperature reported in the literature. This shift in $T_{ox}$ can be attributed to the presence of residual metal catalyst in the AD purified soot. The high temperature TPO data shows that the metal content in the soot was reduced from 43 wt % (FIG. 1) to 6 wt % after the two-step purification treatment.

TABLE 1

| Sample | wt (%) | | | |
| --- | --- | --- | --- | --- |
|  | Amorphous Carbon | SWNT | Multi-shell Carbon | Metal Impurity |
| AD-A Raw arc-discharge formed SWNTs | 26.2 | 21.1 | 9.7 | 43 |
| AD-A1 AD treated with 4 N HCl for 6 hours | 27.1 | 40.3 | 6.6 | 26 |
| AD-A2 AD treated with 12 N HCl for 6 hours | 24.8 | 44.2 | 5.0 | 26 |
| AD-A3 AD treated with 4 N HCl for 24 hours | 25.2 | 44.2 | 4.6 | 26 |
| AD-SO-1 AD, after selective oxidation (SO) refluxed with 4 N HCl for 6 h | 0 | 73 | 12.8 | 14 |
| AD-SO-2 AD, after SO refluxed with 4 N HCl for 24 h | 0 | 82 | 11.8 | 6.2 |
| AD-B Raw arc-discharge tube | 25.5 | 37.5 | 4 | 33 |
| AD-B-SO AD, after SO refluxed with 4 N HCl for 24 h | 2 | 75 | 13 | 10 |

Figure 3A:
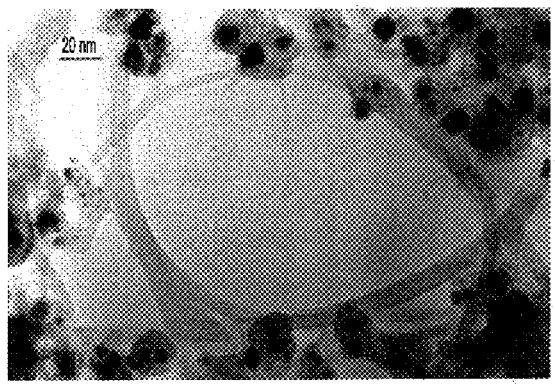
FIGS. 3a and 3b are Transmission Electron Microscopy (TEM) micrographs of a raw, Arc-derived soot.
Figure 3B:
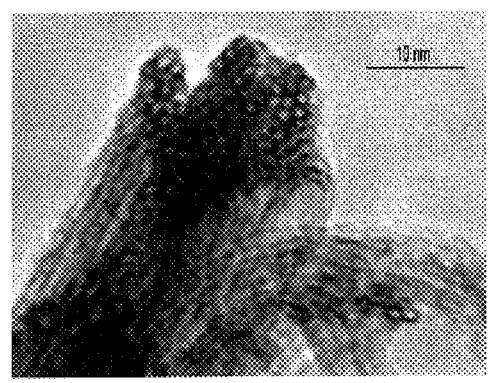
Figure 4A:
FIGS. 4a and 4b are TEM micrographs of a SWNTs after selective oxidation in accordance with an embodiment of the present invention.
Figure 4B:
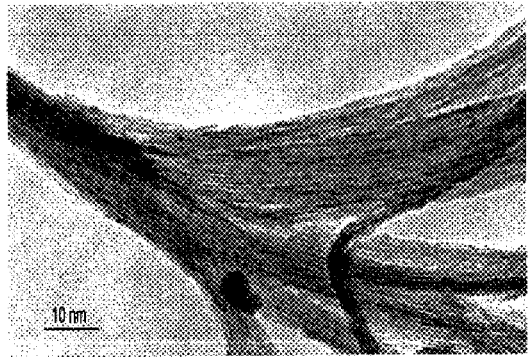
Figure 5:
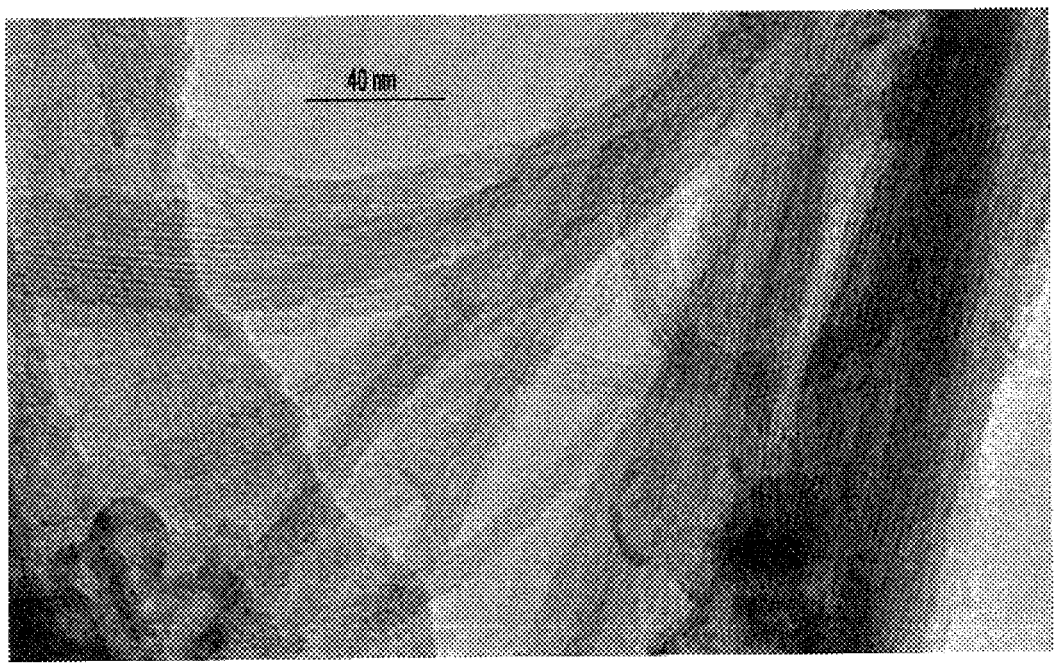
FIG. 5 shows a TEM image of purified SWNTs in accordance with an embodiment of the present invention.

FIG. 3 shows the TEM micrographs of the raw AD soot. The presence of a thick amorphous coating on the SWNT ropes is easily observed, along with multishell carbon in the form of carbon nanoparticles, and as a coating for the metal (catalyst) particles. After selective oxidation treatment, TEM images (FIG. 4) show the presence of tangled bundles of SWNT, with no apparent structural damage to the SWNT. Inspection of the tube walls indicates that essentially all of the amorphous carbon coating on the SWNT burns off, i.e. oxidizes. It is apparent from this result that most of the multi-shell carbons also burns off leaving behind almost bare catalyst particles 5–10 nm in diameter strongly adhering (even wetting) the surface of the rope of SWNT. During this selective oxidation an approximate 30 wt % loss was observed from the sample (by TGA). The TEM images show that the metal particles are strongly bound (with diameter of 5–10 nm) to the SWNT rope. Other TEM images have shown that even after sonication, these metal particles remain firmly attached to the rope walls. For AD soot, it can be shown that ultrasonication followed by purification is not successful, as the catalysts and metal impurities appear to be quite strongly bound to the tube wall, even wetting the bundle walls in many cases. After selective oxidation, TEM images show that carbon coatings on some of the metal particles remains, as shown in FIG. 4b. In FIG. 5, the TEM image of purified SWNTs (selective oxidation followed by HCl reflux), it is observed that most of the catalysts and other metal containing impurities have now been removed. It is further observed what appears to be the "fingerprint" of metal particle attachment. As indicated in FIG. 5, the fingerprint appears as wall defects on the tubes on the outside of the bundle. These defects may provide access to the interior of the SWNT for gases and dopants.

By using TPO, the differentiation of different carbon phases and catalyst present in the soots can be determined. Using the selective oxidation process can reduce or completely remove the amorphous carbon and weaken the multishell carbon, which allows the acid to more effectively affect metal particles and successively reduce or completely remove them. As described by Dujardin et al. Solid State Communication, 114 (2000) 543, some of the metal clusters or isolated atoms are distributed between and within the nanotube, which are difficult to remove. It was also observed by TEM that some of the metal particles wet the tube walls which are difficult to remove. Using the DTPO, the quantification, by wt %, of SWNTs present in the raw as well as in the purified materials can be determined. It should be understood that, as TPO is a catalytic process, the presence of metal containing compounds in the carbon mixture changes the oxidation temperature of the metal contaminated carbon even though the carbon structures are the same. In order to use this process most effectively, an analysis of the soots from each batch is preferred. The purified SWNTs are currently studied in our lab for the Kondo effect in the SWNTs i.e., coupling of conduction electrons in SWNT walls to localized magnetic moments of transition metal catalyst impurity e.g., Ni.

In an another example, high yields of SWNTs were obtained from soot. The process begins by producing an impure mixture of SWNTs employing a catalyst comprising nickel, yttrium, titanium, their salts or any combination thereof. The SWNTs were isolated by first heating the carbon soot comprising a single-wall carbon nanotube and accompanying impurities in air at a temperature of about 500° C. for a period of about 1 hour. By this step, a significant amount of amorphous carbon was eliminated from the mixture. It is believed that the multi-shell carbon coating or carbon otherwise covering metal containing impurities was rendered more susceptible to removal along with the metal containing impurities themselves. The SWNT and any accompanying impurities were then exposed to about 3 molar of aqueous $HNO_3$ at a temperature of about 120° C. for about 12 hours to facilitate removal of nickel containing impurities, such as nickel or salts thereof. The SWNT were then subjected to additional processes for removing carbon impurities, such as exposing the single-wall carbon nanotube and any accompanying impurities to aqueous hydrogen peroxide at a temperature of about 80° C. for about 24 hours. To remove titanium containing impurities or salts thereof, the SWNTs and any accompanying impurities were then exposed to about 10 molar HCl at a temperature of about 120° C. for about 12 hours.

It is possible that nano-structure carbons as well as carbon nanotubes absorb hydrogen. Many functional group containing oxygen were produced by acid treatment using $HNO_3$ under refluxing conditions. It is thought that the high storage performance of these purified carbon structures comes about by removing functional groups on the surface of the carbon structures and thus increasing the surface activity. The structure is believed to change during oxygen desorption by heat treatment and is considered to generate sites that effectively cause hydrogen adsorption. The desorption site of CO is in the temperature range of from about 300° C. to about 650° C., while the desorption site of $CO_2$ is in the processing temperature range of from about 100° C. to about 650° C.

Examples of Hydrogen Storage

Using a standard in situ gravimetric (mass uptake) method, it was observed that arc-derived, single walled carbon nanotubes can store as much as 6.5 wt % hydrogen at liquid nitrogen temperatures (i.e., T=77 K) for pressures (P) of about 2 atmospheres (atm). The material is first subjected to a treatment designed to open holes in the tube walls. By this process, considerable tube wall damage is introduced which may add $sp^3$ character to the surface. Results of theoretical calculations are performed that supports a large increase in the binding energy for hydrogen adsorbed on a "rough" nanotube surface derived from missing atoms that were removed in the activation treatment.

The SWNTs material used in these studies were obtained from Carbolex, Inc. By temperature programmed oxidation (TPO), the material was found to contain approximately 5 atomic % (at %) residual catalyst (mostly Ni). The raw (i.e., as-delivered CarboLex, Inc.) material was analyzed by high resolution transmission electron microscopy (HRTEM) image, FIGS. 3a and b. This SWNT material was first processed to remove undesirable amorphous carbon via a selective oxidation at a temperature of about 350–410° C. in dry air for 30 min. This oxidation was found to weaken the carbon coating passivating most of the metal catalyst particles in the soot to the extent that the metal could be removed via an 8 hr reflux with a mild mineral acid, e.g. 4.0 M HCl at a temperature of about 130° C. The results of the HCl reflux are shown in the HRTEM image. In order to remove endcaps and open holes (introducing defects) in the nanotube walls, these samples were treated by refluxing in 2.6 M $HNO_3$ at a temperature of about 130° C. for about 2–200 hrs. These samples were then washed in distilled water until neutral, i.e. pH equal to about 7.0 was achieved. After this treatment, significant wall damage can be seen in the HRTEM image (FIGS. 4a and b). Much of this $HNO_3$-induced wall damage can be reversed by heating the refluxed material in a high vacuum (P of about $10^{-8}$ Torr) to 1200° C. (FIG. 5).

Hydrogen storage was studied on 75 mg samples at T=77K, 200 and 300 K and at pressures between about 0 and about 20 bar in a thermogravimetric analyzer (TGA) (Hyden, Inc. IGA-3) using ultra high purity (UHP) $H_2$ (99.999%) passed through an oxygen/moisture trap. Before hydrogen loading, the samples were first heated in situ at a vacuum of about $10^{-6}$ Torr to a temperature in the range of about 200°<T<1000° C. for 12 h. The wt % $H_2$ stored at each pressure was collected after the pressure did not appreciably change. This was usually achieved in less than 20 min. The wt % data, corrected for buoyancy effects, was checked on several samples.

The data show the wt % hydrogen uptake for samples refluxed in HCl and $HNO_3$. The data are collected at temperatures of T=77 K, 200 K and 300 K and for pressures up to 16 bars. The various curves are also identified with samples treated under different degassing conditions (temperature/time). The aggressive oxidation in $HNO_3$ (FIGS. 4a and b) has had a significant effect on the wt % storage. It is believed that the aggressive $HNO_3$ treatment creates wall damage that allows $H_2$ access to the internal pores within the SWNTs in the bundle. Additionally, it is believed that the $HNO_3$-reflux conditions has created a roughened tube wall surface. A discussion of this roughness and enhanced binding energy follows.

Although the triangular shaped "interstitial channels", formed at the center of the void created by three parallel adjacent tubes in a bundle, is expected to have the highest binding energy for hydrogen in the bundle, these sites contribute only about ⅛ of the total sites. It is expected that the high storage values observed in these experiments then are associated with the internal pores within individual tubes. Consistent with a physisorption process, decreasing the temperature from T=300 K to 77 K dramatically increases the storage.

A feature of an embodiment of the present invention is that most of the hydrogen storage can be obtained at quite low pressures, i.e., P of less than about 1–2 bar. This indicates that the binding energy of the important sites within the bundles of SWNTs is significantly higher than those found in the SWNT samples of Ye et al. Applied Phys. Lett. 14 (1999) 2307 which stored significant amounts at T=77 K, but at much higher pressures. The connection of the "characteristic storage pressure" p*, which is defined herein as the pressure at which half the maximum observed amount is stored, to the binding energy of $H_2$ on the carbon surface can be understood as follows.

The storage of hydrogen was studied with respect to purified SWNTs by various purification steps and is summarized Table 2. The table also provides for the atomic percent metal residue and the specific surface area (SSA) ($m_2/g$). The vacuum heat-treatment and the SSA measurements were made in situ in the TGA just prior to hydrogen loading. The SSA values of 80–470 $m^2/g$ are low compared to the maximum geometric surface area of a large bundle of open SWNTs, which is expected to be about 1350 $m^2/g$. It is believed that the SSA does not correlate well with wt % hydrogen storage. Although the theoretical SSA associated with an internal pore surface of approximately 1.4 nm diameter SWNT is about 1350 $m^2/g$, no one has yet reported values exceeding about 400 $m^2/g$ for SWNT materials. This suggests that many of the internal pores in a real material have gateways smaller that the kinetic diameter of $N_2$, i.e. about 0.36 nm. This restricted gateway may be associated with the presence of carboxylic acid and other functional groups attached to the carbon atoms edging holes in the tube walls or at open tube ends.

TABLE 2

Sample history and hydrogen storage at 77 K. and 1 atmosphere.

| Sample ID | Sample History | SSA[4] (m²/g) | H[2] (wt %) | Vacuum Anneal T(°0 C.)/time (hr) | Metal (at %)[5] |
|---|---|---|---|---|---|
| A | As Prepared | 270 | 0.52 | 250/12 | 6 |
| B | SO[1], HCl[2] | 320 | 1.1 | 250/12 | 1.5 |
| C | SO[1], HCl[2] | 470 | 2.0 | 1000/20 | 1.5 |
| D | SO[1], HNO$_3$[3] | 180 | 0.32 | 250/12 | <0.2 |
| E | SO[1], HNO$_3$[3] | 250 | 6.4 | 1000/20 | <0.2 |

[1](SO) Selective Oxidation at 350° C. for 30–45 mm in flowing air (100 CCM).
[2]Reflux in 4 M HCl at 120° C. for 6 hr.
[3]Reflux in 2.6 M HNo$_3$ at 130° C. for 30 hr.
[4]Specific Surface Area (BET).
[5]Determined by (TPO).

Experimental Detail

The materials were characterized by HRTEM, TPO, Raman scattering and $N_2$ and $CO_2$ adsorption isotherms. Temperature-programmed oxidation of the samples were carried out in an gravimetric analyzer IGA-003 (Hiden Analytical Instruments). Some experimental conditions included raising the temperature from approximately room temperature to about 1000° C. with a heating rate 5° C./min, under flow of 100 cc/min of dry air. Nitrogen and $CO_2$ adsorption isotherms were measured at 77 K and 300 K respectively using gravimetric analyzer IGA-003 (Hiden Analytical Instruments), prior to the adsorption, the sample was degas under high vacuum ($10^{-7}$ Torr) at 220° C. for overnight. The specific surface area and pores sizes were calculated by using BET and DR equations.

A systematic study was conducted on SWNTs (as prepared and purified) for storage of hydrogen at 77 K and up to 20 bars of pressure. The amount of hydrogen uptake increases with an increase in the number of internal tube channels. The heat treatment of the purified sample at high temperature also improves hydrogen uptake. In the open SWNTs, saturation of hydrogen adsorption takes place at low pressure, which promise a great technological advance over the traditional carbon materials.

The present invention provides enabling methodology for fabricating carbon filaments and fibers, e.g. carbon nanotubes, with improved yield, purity and efficiency. In accordance with embodiments of the present invention, a carbon soot is purified by a selectively oxidizing undesirable carbon impurities. The relative amounts of the components in the soot have been quantified before and after oxidation thereby improving the efficiency of the process. Additional process steps including acid treatment and heat treatment further removes contaminates and effects the structure of the carbon fiber, as desired. The present invention enjoys industrial applicability in manufacturing various types of carbon fiber structures, particularly nano-sized carbon filaments in high yield and substantially free of impurities. In the preceding detailed description, the present invention is described with reference to specifically exemplary embodiments thereof. It will, however, be evident that various modifications and changes may be made thereto without departing from the broader spirit and scope of the present invention, as set forth in the claims. The specification and drawings are, accordingly, to be regarded as illustrative and not restrictive. It is understood that the present invention is capable of using various other combinations and environments and is capable of changes or modifications within the scope of the inventive concept as expressed herein.

What is claimed is:

1. A process for synthesizing a purified single-wall carbon nanotube having open ends, the process comprising the sequential steps of:
    a) heating a mixture comprising a single-wall carbon nanotube and accompanying impurities in the presence of an oxidizing gas at a temperature sufficient to selectively remove a substantial amount of carbon impurities;
    b) exposing the mixture to an acid at a temperature of about 100° C. to about 130° C. to remove a substantial amount of metal impurities; and
    c) exposing the single-wall carbon nanotube to nitric acid at a temperature and time period sufficient to introduce openings in the single-wall carbon nanotube.

2. The process of claim 1, comprising, after step c), heating the single-wall carbon nanotube under vacuum.

3. The process of claim 1, comprising heating the mixture at a temperature of about 295° C. to about 500° C. to selectively remove the substantial amount of carbon impurities.

4. The process of claim 1, comprising heating the mixture at a temperature of about 350° C. to about 410° C. for a period of time of no less than 30 minutes to selectively remove the substantial amount of carbon impurities.

5. A process for synthesizing a purified single-wall carbon nanotube having open ends, the process comprising the sequential steps of:
    a) heating a mixture comprising a single-wall carbon nanotube and accompanying impurities in the presence of an oxidizing gas at a temperature sufficient to selectively remove a substantial amount of carbon impurities;
    b) exposing the mixture to an acid to remove a substantial amount of metal impurities; and
    c) exposing the single-wall carbon nanotube to nitric acid at a temperature of about 130° C. and time period sufficient to introduce openings in the single-wall carbon nanotube.

6. The process of claim 5, comprising exposing the heated and exposed mixture to the $HNO_3$ at a temperature of about 130° C. for a time period of about 2 hours to about 200 hours.

7. A process for synthesizing a purified single-wall carbon nanotube, the process comprising the sequential steps of:
    a) heating a carbon soot comprising a single-wall carbon nanotube and accompanying impurities in air at a temperature of about 500° C. for a period of about 1 hour;
    b) exposing the single-wall carbon nanotube and any accompanying impurities to about 3 molar aqueous nitric acid at a temperature of about 120° C. for about 12 hours;
    c) exposing the single-wall carbon nanotube and any accompanying impurities to aqueous hydrogen peroxide at a temperature of about 80° C. for about 24 hours; and
    d) exposing the single-wall carbon nanotube and any accompanying impurities to about 10 molar HCl at a temperature of about 120° C. for about 12 hours.

8. The process of claim 7, wherein the carbon soot contains nickel, titanium, or salts thereof as impurities.

9. The process of claim 7, wherein the carbon soot was prepared using a catalyst comprising nickel, yttrium, titanium, their salts or any combination thereof.

* * * * *